(12) United States Patent
Tamano et al.

(10) Patent No.: US 6,608,954 B2
(45) Date of Patent: Aug. 19, 2003

(54) OPTICAL FIBER COIL AND MANUFACTURING METHOD THEREOF

(75) Inventors: Kenji Tamano, Yokohama (JP); Takashi Fujii, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 176 days.

(21) Appl. No.: 09/771,893

(22) Filed: Jan. 30, 2001

(65) Prior Publication Data

US 2001/0017968 A1 Aug. 30, 2001

(30) Foreign Application Priority Data

Jan. 31, 2000 (JP) ........................................ 2000-021140

(51) Int. Cl.[7] .............................. G02B 6/16; G02B 6/36
(52) U.S. Cl. ......................................... 385/123; 385/94
(58) Field of Search ................................ 385/123, 127, 385/124, 125, 126, 94

(56) References Cited

U.S. PATENT DOCUMENTS

| 4,453,635 A | * | 6/1984 | Heinzer et al. | 206/408 |
| 4,696,543 A | * | 9/1987 | Pitt et al. | 385/102 |
| 4,883,337 A | * | 11/1989 | Dahlgren | 385/134 |
| 5,596,668 A | * | 1/1997 | DiGiovanni et al. | 385/123 |
| 5,870,194 A | * | 2/1999 | Cordova et al. | 356/465 |
| 6,128,928 A | * | 10/2000 | Antos et al. | 65/398 |
| 6,201,917 B1 | * | 3/2001 | Campion et al. | 385/123 |
| 6,343,173 B2 | * | 1/2002 | Hordvik et al. | 385/102 |

FOREIGN PATENT DOCUMENTS

| JP | 04366902 | 12/1992 |
| JP | 07015058 | 1/1995 |
| JP | 10-123342 | 5/1998 |

OTHER PUBLICATIONS

De Fazio T L et al: "Development issues for automating quadrupole–pattern optical–fiber coil–winding for fiber–optic gyro manufacture" Robotics And Automation, 1994. Proceedings., 1994 IEEE International Conference On San Diego, CA, USA May 8–13, 1994, Los Alamitos, CA, USA, IEEE Comput. Soc May 8, 1994 pp. 202–207, XP010097405.

Koyano Y et al: "Compactly–packaged High Performance Fiber–based Dispersion Compensation Modules" 22nd European Conference On Optical Communication–ECOC'96, vol. 3, pp. 221–224, XP0103144.

* cited by examiner

*Primary Examiner*—Lynn Field
*Assistant Examiner*—Chandrika Prasad
(74) *Attorney, Agent, or Firm*—McDermott, Will & Emery

(57) ABSTRACT

An optical fiber coil of the present invention includes an optical fiber, a storing case which stores the coiled optical fiber therein, and a filler in the storing case. The filler directly comes into contact with the glass portion of the optical fiber or contact with a thin film coating of not more than 1 $\mu$m being formed on a surface of the glass portion and having a hydrogen intrusion suppressing function. According to the optical fiber coil of the present invention, since the filler directly comes into contact with the glass portion of the optical fiber, the microbend loss can be further suppressed and the transmission can be stable.

12 Claims, 4 Drawing Sheets

TEMPERATURE OF 25°C BEING SET CONSTANT

WAVELENGTH OF 1590nm BEING SET CONSTANT

OPTICAL FIBER COIL AND MANUFACTURING METHOD THEREOF

BACKGROUND OF THE INVENTION

1. Field of the Invention

The present invention relates to an optical fiber coil and a manufacturing method thereof used for a chromatic dispersion compensator, a mode dispersion compensator, an optical amplifier, an optical fiber gyroscope and the like.

2. Related Background Art

As an optical fiber coil and a manufacturing method thereof used for an optical amplifier, a chromatic dispersion compensator, a mode dispersion compensator, an optical fiber gyroscope and the like, an optical fiber coil and a manufacturing method thereof described in Japanese Laid-open Patent Publication No. 123342/1998 and the like have been known. The optical fiber coil performs a desired action to optical signals on an optical path. For example, an optical fiber coil used in the optical amplifier is formed by making an EDF (Erbium-Doped optical-Fiber) in a coil shape to amplify the optical signals on the optical path of the optical fiber.

Here, to amplify the light, it becomes necessary for the EDF to ensure some length and it is desirable to form the EDF into a coil bundle to store the EDF spacesavingly in the optical amplifier. To this end, an optical fiber coil which forms the optical fiber formed into a coil bundle has been used. The same goes for optical fiber coils used in other optical parts such as a chromatic dispersion compensator, a mode dispersion compensator, an optical fiber gyroscope and the like besides the optical amplifier. In general, the conventional optical fiber coil has been constituted by winding the optical fiber around a bobbin.

However, the tension remains in the optical fiber which is wound around the bobbin many times and this tension gives rise to the occurrence of microbend loss. Further, due to the difference of linear expansion coefficient between the bobbin and the optical fiber, a stress caused by the deformation of the bobbin is applied to the optical fiber so that the transmission loss is changed depending on temperature. Accordingly, the studies in which the various ideas including the idea described in the above-mentioned publications are made so as to provide a bobbinless optical fiber coil or a bobbin structure having an equivalent effect as the bobbinless optical fiber coil have been made.

However, even with such various ideas, the microbend loss which occurs due to the minute bending of the optical fiber cannot be removed completely. Inventors of the present invention have made extensive studies for minimizing the microbend loss of the optical fiber coil. As a result, the inventors have found that, usually, a resin coating layer formed around a glass portion (core and cladding) of the optical fiber is relevant to the occurrence of the microbend loss. The present invention has been made bade on such a finding and it is an object of the present invention to provide an optical fiber coil which can suppress the microbend loss and exhibit the stable transmission characteristics and a method of manufacturing such an optical fiber coil.

SUMMARY OF THE INVENTION

The optical fiber coil according to the present invention is provided with an optical fiber whose core and cladding are made of a glass portion, a storing case which stores the optical fiber wound around into a coil bundle, and a filler filled in the inside of the storing case. Further, the filler is stored in the storing case in the state that the filler directly comes into contact with the glass portion or in the state that the filler directly comes into contact with a thin film coating having a thickness of not more than 1 $\mu$m which is formed on the surface of the glass portion and has a hydrogen intrusion suppressing function.

Due to such a constitution, according to the optical fiber coil of the present invention, since it is unnecessary to provide a bobbin for maintaining the coil-shaped state, that is, the coil-shaped state is maintained by using the filler around the optical fiber, the occurrence of the microbend loss can be suppressed and the transmission characteristics can be made stable. Further, the optical fiber of the present invention is not provided with a resin coating layer which an optical fiber usually includes and the filler is filled such that the filler directly comes into contact with the glass portion (including a case in which a thin film coating of not more than 1 $\mu$m having a hydrogen intrusion suppressing function is formed on the surface of the glass portion) and hence, the occurrence of the microbend loss can be further suppressed thus further enhancing the stability of the transmission characteristics.

Here, it is preferable that, at a given wavelength within the operating wavelength band of the optical fiber, at least one of the chromatic dispersion or the chromatic dispersion slope of the optical fiber has a sign inverse to a sign of those of an optical fiber for transmission which is optically connected to the optical fiber coil. Further, it is preferable that the operating wavelength band is not less than 1.50 $\mu$m. Still further, it is preferable that, at a given wavelength within the operating wavelength band of the optical fiber, the microbend loss of the optical fiber at the time of bending the optical fiber to a radius of curvature of 20 mm is not less than 1 dB/m.

Further, it is preferable that the diameter of the cladding of the optical fiber is not more than 100 $\mu$m. Still further, the filler is a material having an undisturbed penetration of JIS K 2220 which falls within a range of 5–200 at a measuring temperature of from −40° C. to 100° C. The undisturbed penetration is defined by JIS K 2220-1993 of Japanese Industrial Standard [JIS K 2220-1993 bis 2.(14), 5.3.1(4), 5.3.6 and the like]. The measuring temperature is set to 25° C. in JIS K 2220. It is preferable. And more, it is more preferable that the material which has the undisturbed penetration which falls within the above mentioned range in the whole range of measuring temperature of −40° C. to 100° C. is used.

Further, it is preferable that the filler is a material whose hydrogen generation quantity after a temperature degradation test for 24 hours at a temperature of 60° C. is not more than 1.0 $\mu$l/g. The hydrogen generation quantity is measured as follows. The filler of 1 g which is hardened in a module configuration is sampled and then is put into a glass bottle of 100 ml for a gas chromatography and then 0.04 ml of He (helium) is filled for correction. The glass bottle is held in this condition for 24 hours at 60° C. and then the condition is returned to the normal temperature (23° C.) and thereafter the measurement using the gas chromatography is performed. The data on the hydrogen generation quantity is arranged using the peak area ratio between He and $H_2$.

Further, it is preferable that the refractive index of the filler is greater than the refractive index of the cladding. Still further, it is preferable that the filler contains the hydrogen absorption material.

Further, the method for manufacturing optical fiber of the present invention includes a coiling step which forms an optical fiber having a resin coating layer on the periphery of a glass portion comprised of a core and a cladding into a coil bundle, a coating layer removing step which removes the resin coating layer from the optical fiber formed into a coil bundle, a storing step which stores the optical fiber from which the resin coating layer is removed in a storing case, and a filling step which fills a filler in the inside of the storing case.

Due to such a constitution, according to the method for manufacturing optical fiber coil of the present invention, since the filler is filled in the storing case such that the filler directly comes into contact with the glass portion after the resin coating layer which the optical fiber usually has is removed, the occurrence of a microbend loss derived from the resin coating layer can be suppressed whereby an optical fiber coil having stable transmission characteristics can be manufactured.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
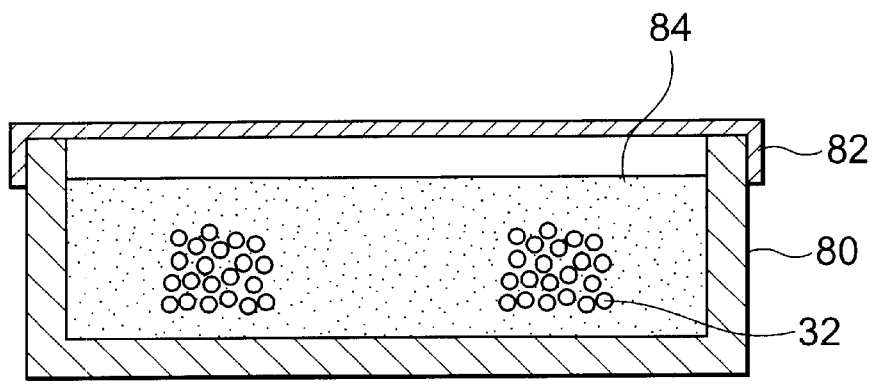
FIG. 1 is a cross-sectional view of an optical fiber coil of one embodiment of the present invention.

An optical fiber coil of an embodiment of the present invention is explained in conjunction with attached drawings. To facilitate the understanding of the present invention, same reference numerals are given to identical constitutional elements in respective drawings as much as possible and the repetitious explanations are omitted.

Figure 2:
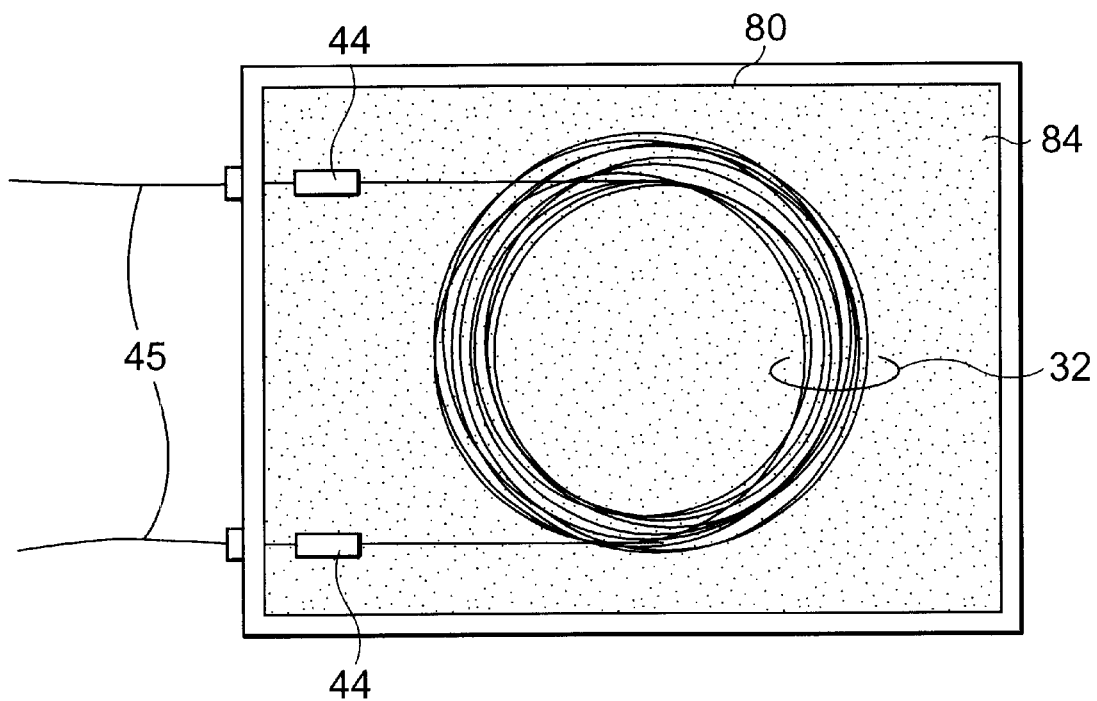
FIG. 2 is a plan view of an optical fiber coil of one embodiment (in the state that a lid is removed) of the present invention.

FIG. 1 is a cross-sectional view showing an optical fiber coil of an embodiment of the present invention and FIG. 2 is plan view of the optical fiber coil in the state that a lid 82 is removed. The optical fiber coil of this embodiment is an optical fiber coil used as a DCFM (Dispersion Compensating optical-Fiber Module) using a chromatic dispersion compensating optical fiber (hereinafter also called DCF: Dispersion Compensating optical-Fiber). The DCF is an optical fiber which has the chromatic dispersion characteristics of a sign inverse to a sign of an optical fiber for transmission such as a single-mode optical fiber and which can offset the chromatic dispersion of an optical transmission path.

As shown in FIG. 1 and FIG. 2, with respect to the optical fiber coil of this embodiment, an optical fiber 32 which is formed into a coil bundle is stored in the inside of a storing case 80 which has a rectangular bottom surface. This optical fiber 32 is in the state that the winding strain is substantially released. Both ends of the optical fiber 32 are connected to pigtail fibers 45 by means of fusing portions 44. In the inside of the storing box 80, a filler 84 is filled such that the filler 84 surrounds the optical fiber 32. The filler 84 is the filled material like the resin. It holds the shape of the coiled optical fiber 32. It can be called shape-holding material. And it is not needed for the case 80 to be filled with the filler 84 fully. There can be the space in the upper inside of the case 80 showed in FIG. 1. Here, it is preferable that the filler 84 penetrates into interstices defined between the coiled optical fiber(s) 32. Then, the lid 82 is mounted on the storing case 80 and is sealed.

Here, the state that the winding strain is substantially released means a state that the increase of the transmission loss in a wavelength band having the wavelength of not less than 1.5 $\mu$m which is brought about by the winding is reduced by not less than 0.1 dB/km. The optical fiber 32 of the present invention is an optical fiber which is wound around a bobbin and then is removed from the bobbin and thereafter is formed into a coil bundle. As disclosed in Japanese Laid-open Patent Publication No. 123342/1998, the increase of the transmission loss of the optical fiber 32 in the state the optical fiber 32 is removed from the bobbin and is disentangled or loosened can be substantially mostly dissolved. When the winding strain is dissolved, the transmission loss caused by the winding strain can be also dissolved.

Figure 3A:
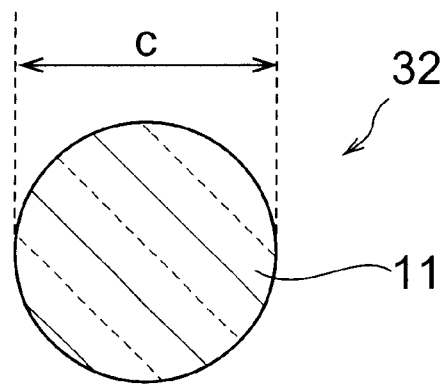
FIG. 3A is a cross-sectional view of an optical fiber used for the optical fiber coil of one embodiment of the present invention.
Figure 3B:
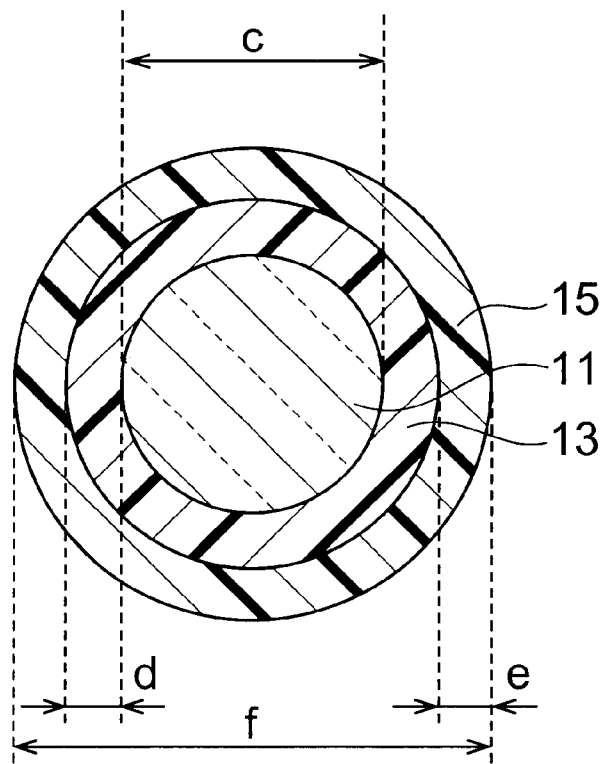
FIG. 3B is a cross-sectional view of the optical fiber of FIG. 3A before a coating layer is removed.
Figure 4:
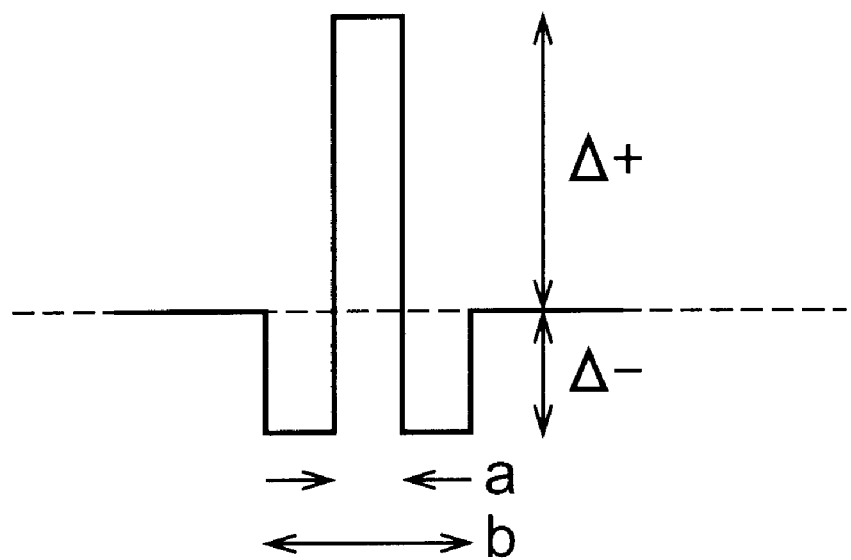
FIG. 4 is a schematic view showing the refractive index difference of the optical fiber of FIG. 3A in the cross-sectional direction of the optical fiber.

FIG. 3A is a cross-sectional view of the optical fiber 32 and FIG. 4 is a view showing the refractive index profile of the optical fiber 32. As shown in FIG. 3A, this optical fiber 32 includes the glass portion 11 which is constituted by the core and the cladding and a carbon coating is applied onto an outer peripheral surface of the cladding. The optical fiber 32 is formed by removing following coating layers 13, 15 from an optical fiber shown in FIG. 3B which forms two-layered coating layers 13, 15 made of ultraviolet-ray curing type resin around the glass portion 11.

The glass portion 11 is a duplicate cladding type DCF having a core diameter a of 2.7 $\mu$m and a depressed portion diameter b of 6.6 $\mu$m (see FIG. 4). The outer diameter c of the glass portion 11 is 120 $\mu$m. As shown in FIG. 3B, the thickness d of the first coating layer 13 before being removed is 15 $\mu$m and the thickness e of the second coating layer before being removed is also 15 $\mu$m, while the outer diameter f of the optical fiber before the coating layers are removed is 190 $\mu$m. $\Delta$(delta)+, $\Delta$(delta)− which are the increase and the decrease of refractive indices of respective core portion and depressed portion to the refractive index of the cladding portion are respectively 1.9%, −0.4%. The chromatic dispersion and the chromatic dispersion slope of this DCF are respectively −120 ps/nm/km and −0.28 ps/nm$^2$/ km at the wavelength of 1.55 μm and the transmission loss is 0.40 dB/km.

The chromatic dispersion value and the chromatic dispersion slope value have signs inverse to signs of the optical fibers for transmission path which are connected to this optical fiber coil. That is, with the use of the optical fiber coil of this embodiment, the chromatic dispersion generated in the optical fibers for the transmission path can be compensated. Further, for the wavelength band transmission, by giving an inverse sign to the chromatic dispersion slope, the chromatic dispersion can be compensated over the wavelength band. Further when the operating wavelength band is not less than 1.50 μm, the usual optical fiber which includes a resin coating made of acrylate-based ultraviolet ray resin or silicone resin exhibits the large increase of the loss due to the microbending. However, the optical fiber of the optical fiber coil of the present invention is not provided with the resin coating layer and hence, even when the optical fiber coil of the present invention is used in the operating wavelength band of not less than 1.50 μm, the increase of the loss is not brought about. In this manner, the optical fiber coil of the present invention is extremely effective.

The carbon coating layer formed on the outer peripheral surface of the cladding is a thin film having a function of suppressing hydrogen to intrude into the glass portion 11. So long as the thin film has the a function of suppressing the intrusion of hydrogen into the glass portion 11, the thin film may be formed in a method other than the carbon coating. For example, a metal film made of titanium or aluminum may be considered. Further, the thickness of this film is set to not more than 1 μm. With the provision of this thin film, the growth of minute scars on the surface of the thin film can be suppressed, the intrusion of the hydrogen into the glass portion 11 is prevented and the degradation of the optical fiber 32 can be prevented.

As the filler 84, thermosetting or ultraviolet ray curing type silicone resin can be used. Alternatively, a highly viscous jelly-like mixture which is produced by swelling rubber such as butadiene-silicone or the like with a solvent such as silicone-naphthene and adding other resin and the like if necessary can be used. This filler 84 is a material which has an undisturbed penetration which falls within 5–200 in the whole range of the measuring temperature from −40° C. to 100° C. defined by JIS K 2220. The temperature range of −40° C. to 100° C. is the practical operating temperature of the optical fiber coil. Further, this filler 84 exhibits not more than 1.0 μl/g of the hydrogen generation quantity after the temperature degradation test at 60° C. for 24 hours and the refractive index of the filler 84 is greater than the refractive index of the cladding (the outermost layer portion of the glass portion 11).

With respect to the coiled optical fiber 32, assume that such an optical fiber is fixedly secured by a usual adhesive agent or resin, the Young's modulus reaches not less than 500 N/mm$^2$ when the resin is hardened and an excessive pressing force is applied to the optical fiber 32 and this force gives rise to the bending strain. Accordingly, the use of the adhesive agent or the resin is not desirable in securing the optical fiber 32. With the use of such a material having a sufficient flexibility and a high viscosity as the filler of this embodiment, it becomes possible to fixedly secure the optical fiber which constitutes the optical fiber coil while preventing an excessive force which gives rise to the bending strain from being applied to the optical fiber.

To this end, it is preferable to use the material having the above-mentioned undisturbed penetration. When the undisturbed penetration is less than 5, the long-wavelength-side loss due to the microbending of the optical fiber becomes too large and hence is not practical. On the other hand, when the undisturbed penetration exceeds 200, it is difficult to maintain the shape of the optical fiber coil with the filler 84 and hence, in the course of use of the optical fiber coil, the coiled state of the optical fiber 32 is collapsed or the like whereby it is difficult to ensure the stability of the transmission characteristics.

Further, by filling the filler 84 in spaces formed among the optical fibers 32, the pressing force applied to respective optical fibers 32 can be made uniform so that the microbend loss caused by the irregular side pressure can be suppressed. As a result, the optical fiber coil which uses a narrow-diameter fiber (the glass portion 11 having an outer diameter of not more than 100 μm) which cannot be used because of its poor resistance to such a bending strain and a fiber having a small Δn which can improve the non-linearity can be easily manufactured. That is, the optical fiber coil of this embodiment is provided with such a filler 84, the use of the optical fiber 32 having the outer diameter of 100 μm becomes possible and with the use of such a narrow diameter fiber, the whole unit of the optical fiber coil can be miniaturized.

Further, the use of the optical fiber which has been difficult to use conventionally because of its poor resistance to the bending strain, that is, the optical fiber which exhibits the microbend loss of not less than 1 dB/m at the time the optical fiber is bent with a diameter of 20 mm at the wavelength within the operating wavelength band becomes possible.

Still further, as mentioned above, the optical fiber 32 of the optical fiber coil in this embodiment is made of only the glass portion 11 and has no coating layer (the coating layers 13, 15 being removed in this embodiment). Accordingly, undesirable side pressure which is applied to the glass portion 11 of the optical fiber 32 due to the presence of the coating layer no more exists and hence, the microbending derived from such a side pressure is not generated. As a result, the optical fiber coil which is excellent in terms of the transmission loss can be obtained. Further, the phenomenon that the transmission characteristics is changed due to the change of Young's modulus corresponding to the temperature of the coating layer and the difference of the expansion coefficient between the coating layer and the glass portion 11 can be dissolved with the use of the optical fiber 32 which is made of only the glass portion 11.

Here, to realize the optical fiber coil using the optical fiber 32 which is made of only the glass portion 11 having no coating layer, the above-mentioned filler 84 has a significant role. That is, since the optical fiber 32 which is made of only the glass portion 11 has the entire periphery thereof wrapped and held by the filler 84, the optical fiber 32 is protected by the filler 84 and simultaneously the collapse of winding of the optical fiber which may be caused by vibration or the like can be prevented by the filler 84. As a result, the optical fiber coil can ensure the stable transmission characteristics for a long period. Further, as mentioned above, when the narrow diameter fiber is used as the optical fiber 32, the microbending is liable to be generated due to the disturbance. However, by wrapping the optical fiber 32 with the filler 84, the disturbance applied to the optical fiber 32 can be reduced so that the transmission loss (particularly the long-wavelength-side loss in the operating wavelength band) can be suppressed.

Further, as mentioned above, although an undesirable light which is generated at the connecting portion of the optical fiber propagates in the cladding, by setting the refractive index of the filler 84 larger than the refractive index of the cladding, the light which is generated at the optical fiber connecting portion can be efficiently and easily escaped outside the optical fiber.

Further, the filler 84 in the optical fiber coil of this embodiment has the hydrogen generation quantity which is not more than 1.0 μl/g after the temperature degradation test for 24 hours at 60° C. When the hydrogen permeates the glass portion 11 (particularly, the core) of the optical fiber 32, the transmission loss is worsened. Accordingly, using a filler whose hydrogen generation quantity after the temperature degradation test for 24 hours at 60° C. is not more than 1.01 μl/g as the filler 84, it becomes possible to maintain the transmission characteristics of the optical fiber coil in the favorable state. When the above-mentioned hydrogen generation quantity exceeds 1.01 μl/g, the hydrogen generation quantity from the filler becomes large so that the transmission characteristics of the optical fiber coil is worsened. In this embodiment, by forming the above-mentioned thin film on the outer peripheral surface of the cladding, the intrusion of the hydrogen into the inside of the optical fiber 32 can be prevented.

Although, in this embodiment, the filler 84 per se is made of the material whose hydrogen generation quantity is small, the same advantageous effect can be obtained by making the filler 84 contain a material which can absorb the hydrogen. By making the filler 84 contain the hydrogen absorption material, even when the filler 84 generates the hydrogen, the hydrogen absorption material contained in the filler 84 can absorb the hydrogen. As a result, there is no case that the hydrogen acts on the optical fiber 32 and it becomes possible to prevent the transmission characteristics of the optical fiber coil from becoming worsened. As the hydrogen absorption material, Pd (palladium) alloy, La (lanthanoid)-Ni alloy, La—Ni—Mn alloy, La—Ni—Al alloy, V (vanadium)-Ti—Cr alloy and the like can be used.

Figure 5A:
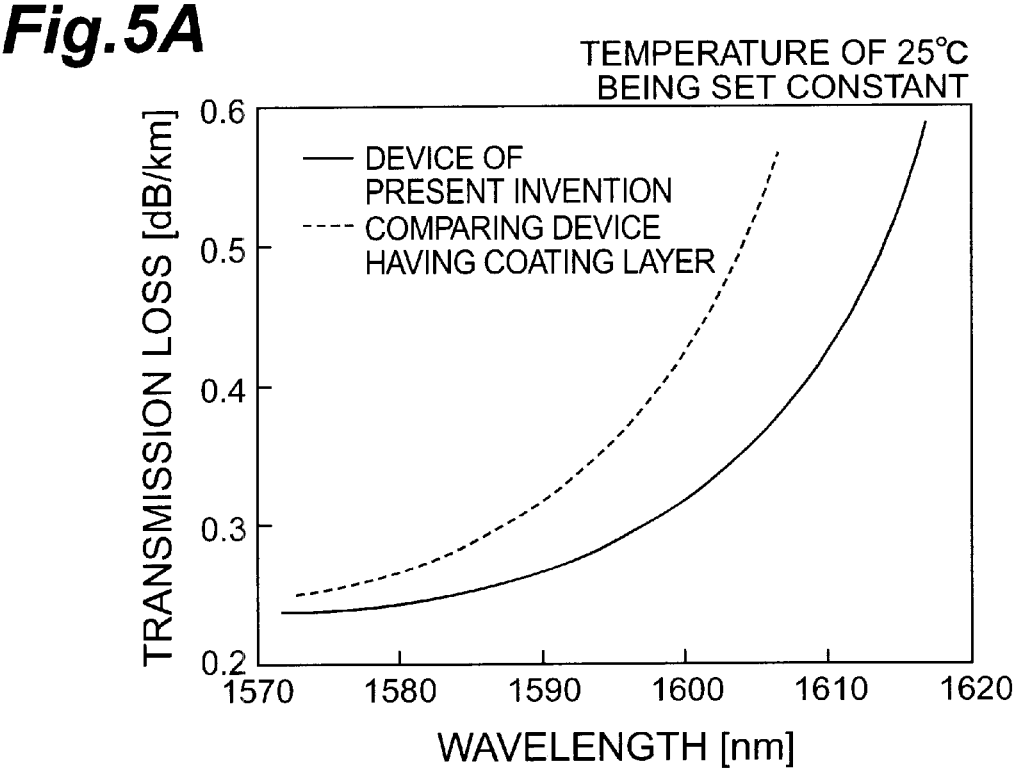
FIG. 5A is graph on a transmission loss of the optical fiber coil of the present invention and of a comparing device showing the relationship between the transmission loss and the wavelength.
Figure 5B:
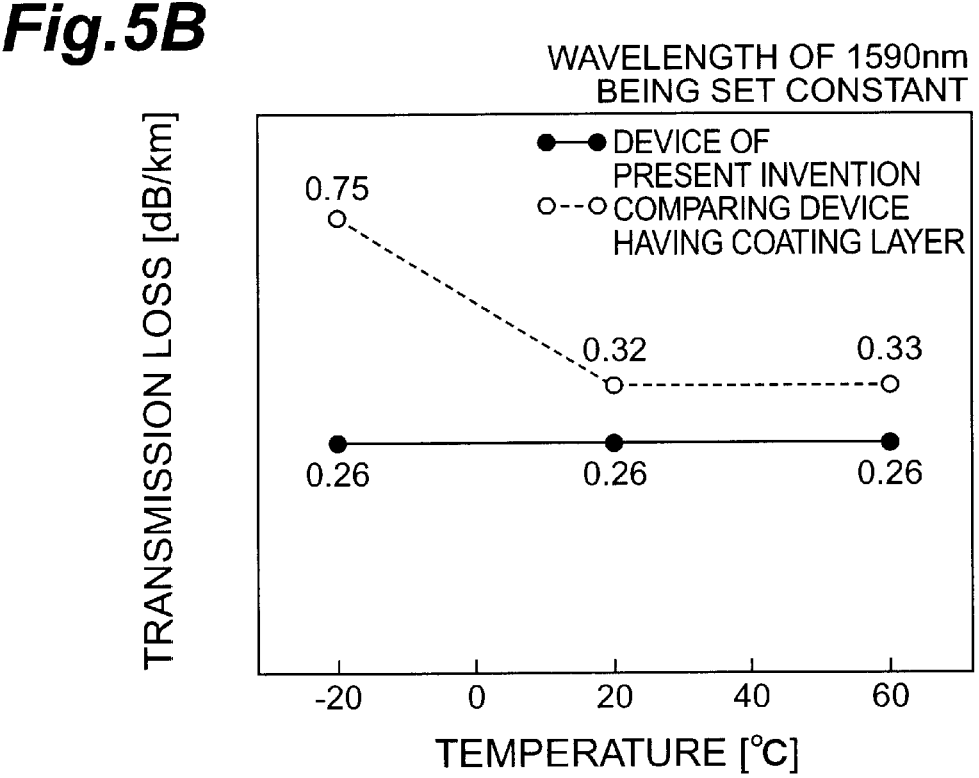
FIG. 5B is graph on a transmission loss of the optical fiber coil of the present invention and of a comparing device showing the relationship between the transmission loss and the temperature.

In the optical fiber coil of the present invention, a test for confirming the transmission loss reducing effect obtained by the constitutional feature that the optical fiber is made of only the glass portion (having no coating layer) was carried out. The result of the test is shown in FIG. 5. FIG. 5A shows the transmission loss to the wavelength and FIG. 5B shows the transmission loss to the temperature. As the device of the present invention, the device described above was used. On the other hand, as the comparing device, in place of the optical fiber 32 described in the above-mentioned embodiment, the optical fiber having the coating layers of the same length as the optical fiber before the coating layers are removed was used (see FIG. 3B). Except for the above points, both of them have the completely same constitution.

As can be understood from FIG. 5A, the optical fiber coil which constitutes the device of the present invention has the superior transmission characteristics to the optical fiber coil which constitutes the comparing device. Particularly, it is understood that the improvement of the transmission characteristics of the device of the present invention at the long wavelength side is remarkable. As can be also understood from FIG. 5B, the optical fiber coil which constitutes the device of the present invention exhibits the stable transmission loss irrelevant to the change of the temperature. To the contrary, the optical fiber coil which uses the optical fiber having the coating layers suffers from the large transmission loss as a whole and particularly the increase of the transmission loss at the lower temperature side is remarkable.

Then, the method for producing the above-mentioned optical fiber coil is explained hereinafter.

First of all, the optical fiber having the coating layers 13, 15 shown in FIG. 3B is wound around the bobbin a plural times to form the optical fiber into a coil bundle (coiling step). Subsequently, the coiled optical fiber is removed from the bobbin while maintaining the coiled shape (optical fiber removing step). Then, by applying a slight vibration or the like to the optical fiber in the state removed from the bobbin, the microbending which has been already generated is dissolved.

To remove the coiled optical fiber from the bobbin and to loosen the winding, as described in Japanese Laid-open Patent Publication 123342/1998, it is preferable that before winding the optical fiber around the bobbin, a lubricant such as minute powder or the like is preliminarily coated on a barrel portion of the bobbin and thereafter the optical fiber is removed from the bobbin. As such a lubricant, talc (Rikagaku Jiten, Fourth edition, page 239) which is used an a powdery inorganic filler or the like can be used. Alternatively, using a bobbin which can narrow the barrel diameter, after winding the optical fiber around the bobbin, the barrel diameter of the bobbin is narrowed so as to facilitate the removal of the optical fiber from the bobbin. It is preferable that the tension at the time of winding the optical fiber around the bobbin is small, and it is particularly preferable that the tension is set to not more than 0.4 N.

Subsequently, the removed optical, as a whole, is immersed into a solvent such as sulfuric acid or acetone. As a result, the coating layers 13, 15 are dissolved in the solvent and the optical fiber 32 made of only the glass portion 11 is formed (coating removing step). Although the thin film made of carbon coating is applied to the outer peripheral surface of the glass portion 11, this thin film is not dissolved into the solvent.

Then, the coiled optical fiber 32 from which the coatings are removed is stored in the inside of the storing case 80 (storing step). The filler 84 is filled in the inside of the storing case 80 and the whole optical fiber 32 is wrapped by the filler 84. Here, the filler 84 has a fluidity of a degree which facilitates the filling of the filler 84 into the inside of the storing case 80 and hence, the filler 84 is filled in the inside of the storing case 80 such that the filler 84 wraps the whole optical fiber 32 and thereafter the filler 84 is hardened and holds the optical fiber 32 (filling step).

With respect to a method for hardening the filler 84, the thermosetting or the ultraviolet ray curing can be used depending on the property of the resin used as the filler 84. In case of the thermosetting, as an example, the resin is hardened by heating the resin for 24 hours at 50° C. Further, the above-mentioned desirable undisturbed penetration relates to the filler after hardening.

It is preferable that the filler 84, at the time of being filled in the inside of the storing case 80, has a surface tension of not more than 400 $\mu N/cm^2$ to prevent the generation of bubbles or the like in spaces formed among the coiled optical fiber(s) 32. Further, it is preferable for the filler 84 to maintain the viscosity thereof not more than 10 $N \cdot s/m^2$ such that the filler 84 sufficiently permeates into spaces formed among the optical fibers 32. Further, it is preferable that when the filler 84 is hardened, the viscosity of the filler 84 is kept at not more than 10 $N \cdot s/m^2$ for not less than two hours from the starting of hardening. In this case, the filler 84 sufficiently permeates into spaces formed among the optical fibers 32 and the generation of microbending undesirable to the optical fiber 32 can be prevented.

As the filler 84, thermosetting or ultraviolet ray curing silicone resin having the Young's modulus of not more than 0.5 N/mm² can be used. Alternately, as the filler 84, a highly viscous jelly-like mixture which is produced by swelling rubber such as butadiene-silicone or the like with a solvent such as silicone-naphthene and adding other resin and the like if necessary can be used. As has been previously mentioned, with the use of such a material having the high flexibility and the high viscosity as the filler 84, the optical fiber 32 can be surely fixedly secured without applying an excessive pressing force which generates the bending strain to the optical fiber 32.

The present invention is not limited to the above-mentioned embodiment. For example, although the above-mentioned embodiment relates to the optical fiber coil which adopts the chromatic dispersion compensating optical fiber (DCF), the optical fiber coil may adopt other optical fibers. For example, the present invention is applicable to the optical fiber coil which adopts the single-mode optical fiber, the chromatic dispersion shift optical fiber, the NZ-type chromatic dispersion shift optical fiber, the Erbium-doped optical fiber or the polarization maintaining optical fiber.

The single mode optical fiber (also called SMF: Single Mode optical-Fiber) is an optical fiber which is designed with a main purpose of performing the transmission of optical signals in a wavelength band of 1.3 μm. When the transmission of the optical signals is performed in a wavelength band of 1.55 μm using this optical fiber, a phenomenon called the chromatic dispersion is generated. This chromatic dispersion can be compensated by an equipment which forms the chromatic dispersion compensation optical fiber into a module (DCFM). Contrary to the above, the SMF is used in a case that the optical signals having the negative chromatic dispersion due to the above-mentioned DCF are compensated with the positive chromatic dispersion of the SMF per se. In this case, the SMF may be formed into a module in use.

The chromatic dispersion shifted optical fiber (also called DSF: Dispersion Shifted optical-Fiber) is an optical fiber which is designed with a main purpose of performing the transmission of optical signals in a wavelength band of 1.55 μm. This optical fiber has characteristics that the chromatic dispersion value to the wavelength band of 1.55 μm is zero. The DSF may be used as an optical fiber for Raman scattering excitation. The DSF may be formed into a module in use.

The NZ type chromatic dispersion shifted optical fiber (also called NZ-DSF: Non Zero Dispersion Shifted optical-Fiber) is an optical fiber which is designed such that the wavelength which makes the chromatic dispersion zero is slightly shifted from 1.55 μm to reduce the non-linear phenomenon in the above-mentioned DSF. The NZ-DSF may be used as an optical fiber for Raman scattering excitation.

The Erbium doped optical fiber (also called EDF: Erbium Doped optical-Fiber) is an optical fiber whose core is doped with Erbium ions. When a signal light having a wavelength band of from 1.53 to 1.61 μm is incident on the optical fiber in the state that the lights having wavelengths 0.98 μm, 1.48 μm are absorbed in the optical fiber, the stimulated emission is generated so that the power of the signal light is amplified. Usually, the EDF is used in a form of a module such as an optical amplifier (also called EDFA: Erbium Doped optical-Fiber Amplifier hereinafter) or the like.

The polarization maintaining optical fiber (also called PMF: Polarization Maintaining optical-Fiber) is an optical fiber which transmits optical signals while maintaining the linear polarized wave and is used as an optical fiber gyroscope or a polarization mode dispersion compensator or the like. Usually, the PFM is formed into a module and is used as a PMFM (Polarization Maintaining optical-Fiber Module).

As shown in FIG. 1, the optical fiber 32 is not contact with a bottom surface of the storing case 80. This is a preferable structure because the received pressure by the optical fiber 32 from the bottom surface of the case 80 becomes reduced. For example, the above-mentioned structure is made by a method mentioned below. The optical fiber 32 may be stored in the storing case 80 such that a small amount of the filler 84 is filled in the inside of the storing case 80, then the coiled optical fiber 32 is stored in the storing case 80, and thereafter the remaining filler 84 is filled in the storing case 80 and hardened.

And, the form of the storing case is not limited to the storing case described in the above-mentioned embodiment and may be in a donut-shape or the bottom surface may be a curved surface in place of a flat surface.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber coil comprising;

an optical fiber including a core and a cladding which are made of a glass portion, a storing case accommodating said optical fiber which is wound into a coil bundle, and a filler filled in the inside of said storing case, wherein said filler is filled in said storing case in a state that said filler directly comes into contact with said glass portion or in a state that said filler directly comes into contact with a thin film coating of not more than 1 μm being formed on a surface of said glass portion and having a hydrogen intrusion suppressing function.

2. An optical fiber coil according to claim 1, wherein said optical fiber, at a given wavelength in an operating wavelength band, has at least one of a chromatic dispersion and a chromatic dispersion slope given a sign in inverse relation to a sign of a chromatic dispersion and a chromatic dispersion slope of an optical fiber for transmission path which is optically connected to said optical fiber coil.

3. An optical fiber coil according to claim 1, wherein said operating wavelength band has a wavelength of not less than 1.50 μm.

4. An optical fiber coil according to claim 1, wherein at a given wavelength in an operating wavelength band, a microbend loss when said optical fiber is bent with a radius of curvature of 20 mm is not less than 1 dB/m.

5. An optical fiber coil according to claim 1, wherein the diameter of said cladding of said optical fiber is not more than 100 μm.

6. An optical fiber coil according to claim 1, wherein said filler is a material whose undisturbed penetration defined by JIS K 2220 is within 5 to 200 in a whole range of a measuring temperature of from −40° C. to 100° C.

7. An optical fiber coil according to claim 1, wherein said filler is a material whose undisturbed penetration defined by JIS K 2220 is within 5 to 200 at a measuring temperature of 25° C.

8. An optical fiber coil according to claim 2, wherein said filler is a material whose undisturbed penetration defined by JIS K 2220 is within 5 to 200 at a measuring temperature of 25° C.

9. An optical fiber coil according to claim 1, wherein said filler is a material whose hydrogen generation quantity after performing a temperature degradation test for 24 hours at 60° C. is not more than 0.1 μl/g.

10. An optical fiber coil according to claim 1, wherein the refractive index of said filler is set to a value greater than the refractive index of said cladding.

11. An optical fiber coil according to claim 1, wherein said filler includes a hydrogen absorption material.

12. A method of manufacturing an optical fiber coil comprising;

a coiling step for forming an optical fiber having a resin coating layer on a periphery of a glass portion including a core and a cladding into a coil bundle, a coating layer removing step for removing said resin coating layer from said optical fiber formed into a coil bundle, a storing step for storing said optical fiber from which said resin coating layer is removed into a storing case, and a filling step for filling a filler into said storing case.

* * * * *